(12) United States Patent
Maupin

(10) Patent No.: US 8,578,799 B2
(45) Date of Patent: Nov. 12, 2013

(54) METHOD AND SYSTEM FOR SHAFT COUPLING

(76) Inventor: Arthur N. Maupin, Columbus, OH (US)

(*) Notice: Subject to any disclaimer, the term of this patent is extended or adjusted under 35 U.S.C. 154(b) by 0 days.

(21) Appl. No.: 13/302,548

(22) Filed: Nov. 22, 2011

(65) Prior Publication Data
US 2012/0125137 A1    May 24, 2012

Related U.S. Application Data

(60) Provisional application No. 61/417,023, filed on Nov. 24, 2010.

(51) Int. Cl.
*F16H 21/12* (2006.01)
(52) U.S. Cl.
USPC ............ 74/63; 464/49; 464/75; 464/85; 16/54
(58) Field of Classification Search
USPC .......................... 74/63; 464/49, 75, 85; 16/54
See application file for complete search history.

(56) References Cited

U.S. PATENT DOCUMENTS

| | | | |
|---|---|---|---|
| 3,606,218 A * | 9/1971 | Enlund et al. ................. | 248/74.2 |
| 3,718,009 A * | 2/1973 | Perina .............................. | 464/30 |
| 4,204,739 A | 5/1980 | Shoenleben | |
| 4,439,168 A | 3/1984 | Orain | |
| 4,784,509 A | 11/1988 | Gozzano | |
| 4,917,653 A * | 4/1990 | Collucci .......................... | 464/85 |
| 5,152,187 A * | 10/1992 | LaFemina ....................... | 74/553 |
| 5,326,186 A * | 7/1994 | Nyberg .......................... | 403/378 |
| 5,993,101 A | 11/1999 | Kohno et al. | |
| 6,601,802 B1 | 8/2003 | Howe | |
| 6,671,475 B2 | 12/2003 | Katada et al. | |
| 6,968,144 B2 * | 11/2005 | Mizoguchi ..................... | 399/167 |
| 7,043,180 B2 * | 5/2006 | Askren et al. ................. | 399/265 |
| 7,264,494 B2 | 9/2007 | Kennedy et al. | |
| 7,281,538 B2 * | 10/2007 | Haase et al. ............. | 128/200.18 |
| 7,424,247 B2 * | 9/2008 | Iwasaki ......................... | 399/117 |

(Continued)

FOREIGN PATENT DOCUMENTS

JP      2010196771 A     9/2010

OTHER PUBLICATIONS

PCT Form 210, International Search Report for PCT/US2011/062056, mailed on Jul. 9, 2012.

(Continued)

*Primary Examiner* — David M Fenstermacher
(74) *Attorney, Agent, or Firm* — The Law Office of Patrick F. O'Reilly III, LLC

(57) ABSTRACT

A method and system for a shaft coupling assembly is provided. The assembly includes a first coupling half coupled to a distal end of a first shaft wherein the first coupling half includes one or more projections extending away from the first coupling half. The shaft coupling assembly also includes a second coupling half coupled to a distal end of a second shaft wherein the second coupling half includes a media configured to matingly engage the one or more projections in an axial direction, the projections include a relatively large length to width ratio, the media displaces orthogonally to the insertion direction an amount sufficient to facilitate the insertion for each individual projection while substantially preventing gross movement of all of the projections in total such that a linear force or torque applied to one coupling half is transmitted through the mated projections and media.

16 Claims, 13 Drawing Sheets

(56) References Cited

U.S. PATENT DOCUMENTS

| | | | |
|---|---|---|---|
| 7,443,121 B2 | 10/2008 | Nagai et al. | |
| 7,625,290 B2 * | 12/2009 | Hodjat et al. | 464/75 |
| 7,658,678 B2 * | 2/2010 | Kneeshaw et al. | 464/49 |
| 7,726,997 B2 | 6/2010 | Kennedy et al. | |
| 7,793,893 B2 * | 9/2010 | Opperthauser | 248/62 |
| 8,029,371 B2 * | 10/2011 | Stamps et al. | 464/85 |
| 2002/0130516 A1 | 9/2002 | Sewell | |
| 2005/0095891 A1 * | 5/2005 | Schorn | 439/274 |
| 2010/0180399 A1 * | 7/2010 | Patzer et al. | 16/54 |

OTHER PUBLICATIONS

PCT Form 373, International Preliminary Report on Patentability for PCT/US2011/062056, date of issuance of report: May 28, 2013; PCT Form 237: Written Opinion of the International Searching Authority for PCT/US2011/062056, date of mailing: Jul. 9, 2012.

* cited by examiner

METHOD AND SYSTEM FOR SHAFT COUPLING

CROSS REFERENCE TO RELATED APPLICATIONS

This application claims the benefit of U.S. Provisional Patent Application No. 61/417,023 filed Nov. 24, 2010, which is hereby incorporated by reference in its entirety.

BACKGROUND OF THE INVENTION

The field of the invention relates generally to power transmission devices, and more specifically, to a method and system for coupling machine elements.

A rotational accuracy and repeatability of known two part couplings used to couple coaxial shafts or other machine elements has been limited by a spacing of the pins, teeth or other projections in one coupling half that mate with defined sockets or other mating receptacles in the other coupling half. Readjustment in a second step is typically necessary for better accuracy of rotational alignment. Retention of rotational alignment or repeatability from one engagement cycle to the next is limited by the angular distance between projections (pitch in a geared coupling).

Friction couplings or clutches theoretically have a continuous resolution that is not possible in a coupling or clutch with discrete mating parts. Friction couplings depend on relatively high mating forces applied orthogonally to the direction of a rotational torque to be transmitted if they are to operate without slippage and loss of resolution.

Known couplings of current design have limitations including lack of rotational accuracy, repeatability and high coupling force required, which limit their usefulness or applicability in numerous applications.

BRIEF DESCRIPTION OF THE INVENTION

In one embodiment, a shaft coupling assembly includes a first coupling half coupled to a distal end of a first shaft wherein the first coupling half includes one or more projections extending away from the first coupling half. The shaft coupling assembly also includes a second coupling half coupled to at least one of a distal end of a second shaft and a machine element wherein the second coupling half includes a media configured to matingly engage the one or more projections in an axial direction of the projections, where the one or more projections include a relatively large length to width ratio and when inserted into the media, the media displaces orthogonally to the insertion direction an amount sufficient to facilitate the insertion for each individual projection while substantially preventing gross movement of all of the projections in total such that a linear force or torque applied to one coupling half is transmitted through the mated projections and media.

In another embodiment, a method of positioning an object includes extending a first coupling flange towards a face of a second coupling flange, engaging a resilient media that forms at least a portion of the face using one or more rigid pins extending toward the face from the first coupling flange, applying a force to the resilient media through the pins, and translating the second coupling in the direction of the force using the applied force.

In yet another embodiment, a precision positioning system includes a source of mechanical power including a power shaft configured to transmit the mechanical power, a device configured to be translated from a first position to a second position using a load shaft, and a shaft coupling assembly configured to couple the power shaft to the load shaft during a positioning period and to decouple the power shaft from the load shaft during a quiescent period. The shaft coupling assembly including a first coupling half coupled to a distal end of one of the power shaft and the load shaft, the coupling half including one or more projections extending away from the first coupling half, a second coupling half coupled to a distal end of an other of the power shaft and the load shaft, the second coupling half including a media configured to matingly engage the one or more projections in an axial direction of the projections, where the one or more projections include a relatively large length to width ratio and when inserted into the media, the media displaces orthogonally to the insertion direction an amount sufficient to facilitate the insertion for each individual projection while substantially preventing gross movement of all of the projections in total such that a linear force or torque applied to one coupling half is transmitted through the mated projections and media.

BRIEF DESCRIPTION OF THE DRAWINGS

FIGS. 1A-12 show exemplary embodiments of the method and system described herein.

FIG. 1A is a perspective view of a pin felt coupling device in an uncoupled configuration in accordance with an exemplary embodiment of the present invention;

FIG. 4 is an exploded view of a dual pin felt coupling device in accordance with yet another exemplary embodiment of the present invention;

FIG. 5 is a perspective view of driver pin array in accordance with an exemplary embodiment of the present invention;

FIG. 6 is a perspective view of a driver side of output rotor in accordance with an exemplary embodiment of the present invention;

FIG. 7 is a perspective view of a cam side of output rotor in accordance with an exemplary embodiment of the present invention;

FIG. 8 is a perspective view of rotary cam in accordance with an exemplary embodiment of the present invention;

FIG. 9 is a perspective view of fixed cam in accordance with an exemplary embodiment of the present invention;

FIG. 10 is a perspective view of shaft in accordance with an exemplary embodiment of the present invention;

FIG. 11 is a perspective view of fully assembled pin felt coupling device in an uncoupled configuration where shaft is freely rotatable while holding output rotor stationary;

FIG. 12 is a perspective view of fully assembled pin felt coupling device in a coupled configuration where a rotation force applied to shaft is transferred through pins and receptive media;

DETAILED DESCRIPTION OF THE INVENTION

The following detailed description illustrates embodiments of the invention by way of example and not by way of limitation. It is contemplated that the invention has general application to structural and methodical embodiments of a power transfer device in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1A:
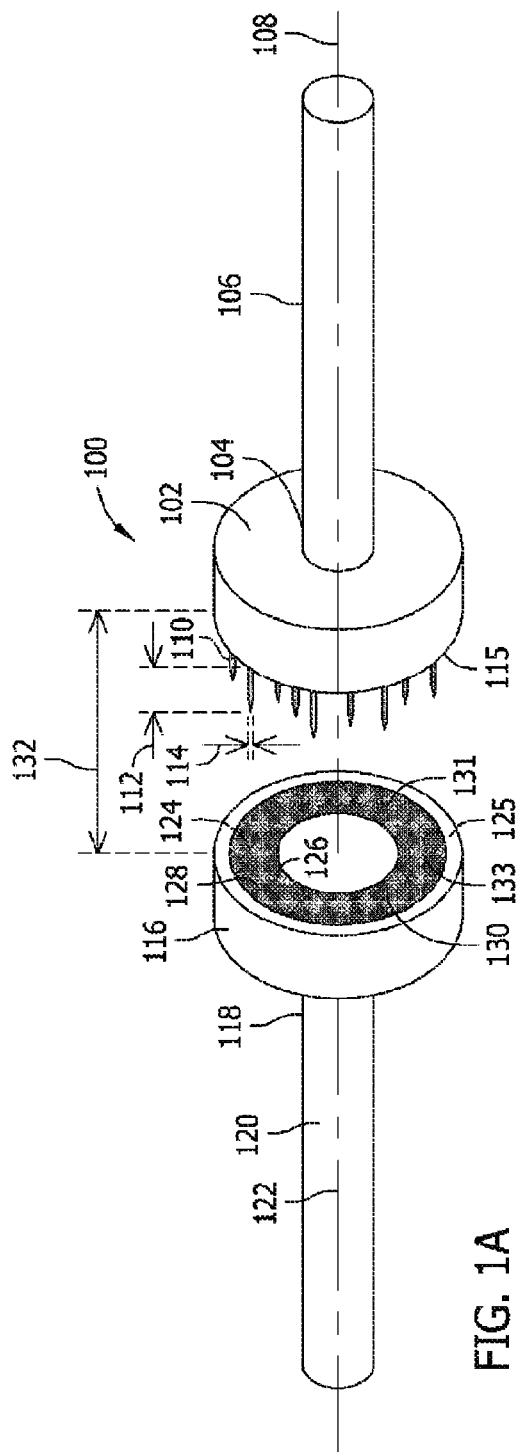
Figure 1B:
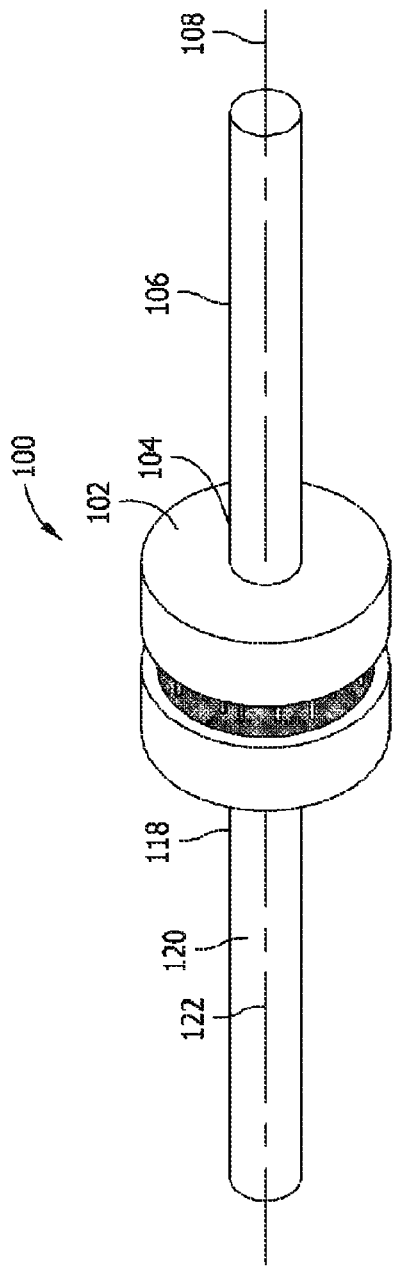
FIG. 1B is a perspective view of coupling device in a coupled configuration.

FIG. 1A is a perspective view of a pin felt coupling device 100 in an uncoupled configuration in accordance with an exemplary embodiment of the present invention. FIG. 1B is a perspective view of coupling device 100 in a coupled configuration. In the exemplary embodiment, coupling device 100 includes a first flange 102 coupled to a distal end 104 of a first shaft 106. First shaft 106 includes a longitudinal axis of rotation 108. First flange 102 includes one or more axially extending pins 110 having a height 112 and a diameter 114 that extend axially away from a face 115 of first flange 102. Although described as pins having a diameter, pins 110 can be embodied in pins, prongs, studs, or other projections and can have any shaped cross-section and diameter 114 may refer to, rather than a circular dimension, but rather a cross-sectional dimension substantially perpendicular to axis 108. In the exemplary embodiment, height 112 is significantly greater than diameter 114.

Figure 15:
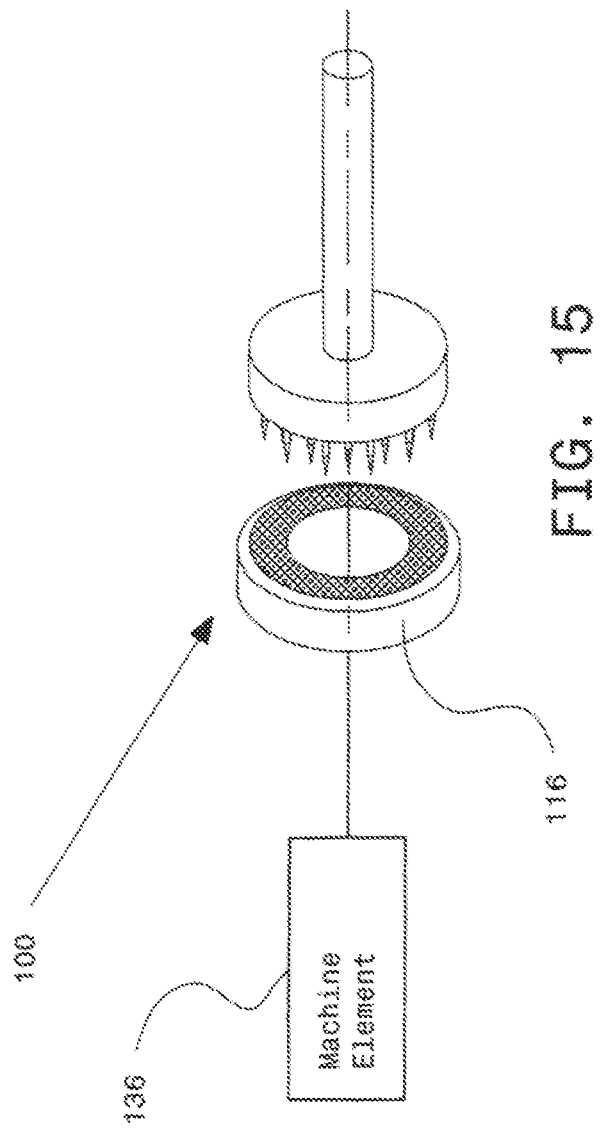
FIG. 15 is a perspective view of a coupling device in an uncoupled configuration in accordance with an exemplary embodiment of the present invention, wherein a machine element, which is operatively coupled to one of the coupling halves, is diagrammatically illustrated.

Coupling device 100 also includes a second flange 116 coupled to a distal end 118 of a second shaft 120. Alternatively, as shown in FIG. 15, the second flange 116 may be coupled to a machine element 136. Second shaft 120 includes a longitudinal axis of rotation 122. Second flange 116 includes one or more circumferentially extending grooves 124 extending along a face 125 of flange 116. In the exemplary embodiment, groove 124 is defined by a radially inner sidewall 126 and a radially outer sidewall 128. A receptive media 130 is positioned between inner sidewall 126 and outer sidewall 128 within groove 124. Receptive media 130 may be formed of, for example, but not limited to, felt, metal wool, and gel. In one embodiment, a surface 131 of receptive media 130 extends axially beyond face 125.

During use, first flange 102 and second flange 116 are positioned face-to-face a distance 132 apart. Distance 132 is selectable to permit an engagement of pins 110 and receptive media 130 to a coupled configuration of coupling device 100 (shown in FIG. 1B) and a disengagement of pins 110 and receptive media 130 in an uncoupled configuration (shown in FIG. 1A) of coupling device 100. Receptive media 130 is formed of a material that is penetrable by pins 110 and sufficiently resilient to receive a rotational force in the circumferential direction from pins 110 and transfer the force to second flange 116. Pins 110 engage receptive media 130 by penetrating a surface of receptive media 130 or by fitting into cavities 133 in surface 131. In one embodiment, cavities 133 are formed in surface 131 complementary to pins 110. In various embodiments, cavities 133 are formed in surface 131 by the engagement of pins 110 with surface 131. For example, a pin 110 engaging surface 131 may dislocate a local portion of surface 131 to create an opening through which pin 110 is able to further penetrate surface 131 and slide into full engagement with media 130. Dislocating the local portion and sliding past media 130 causes friction between pins 110 and media 130, which defines an amount of axial force needed to fully engage pins 110 and media 130. Pins 110 and media 130 are selected such that engagement and disengagement of pins 110 and media 130 results in a relatively minor amount of long term damage to either pins 110 or media 130 thereby providing a relatively long life and/or number of engagement/disengagement cycles. After engagement, one of shafts 106 or 120 can drive the other through coupling device 100. Engagement and disengagement normally only occurs when shafts 106 and 120 are stationary.

Figure 2A:
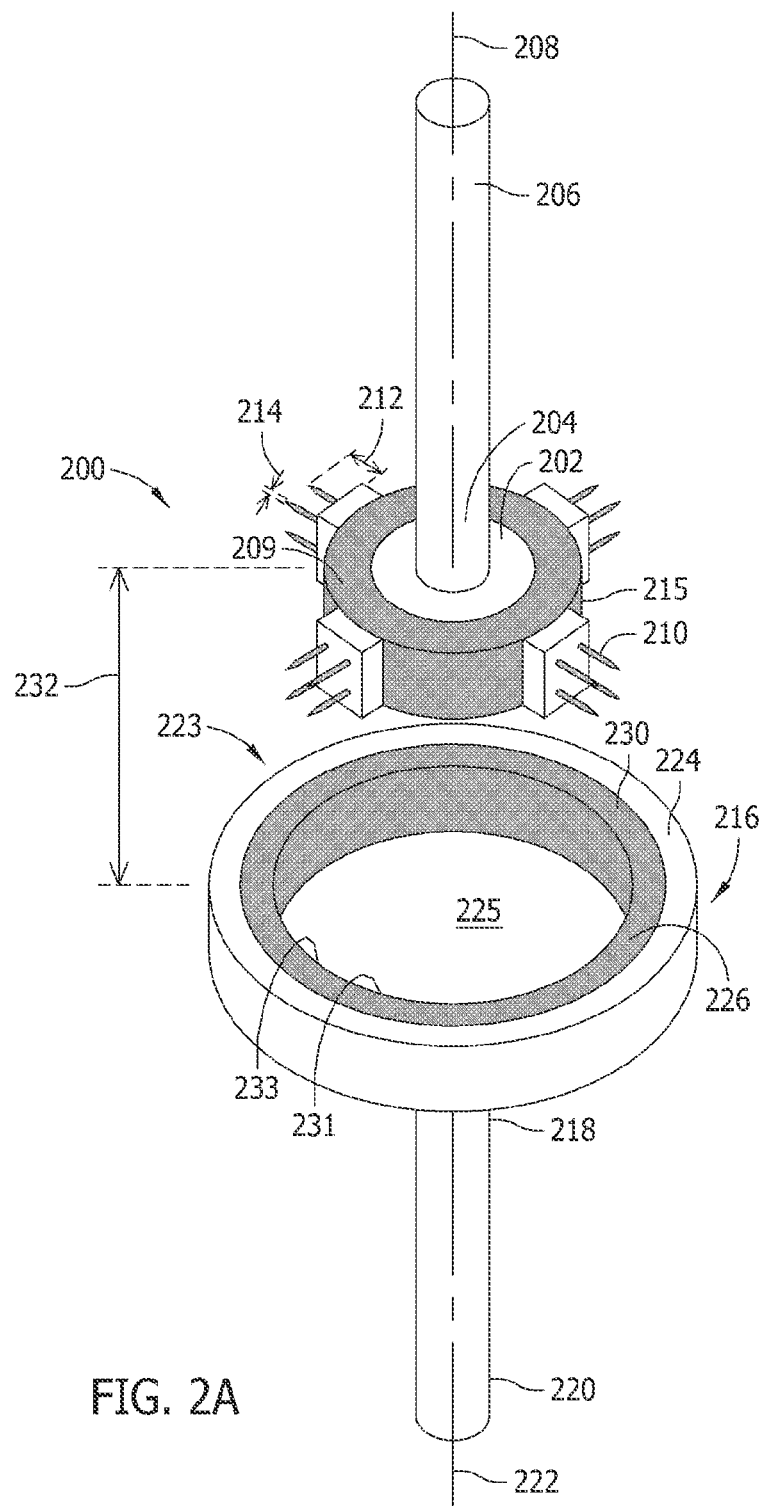
FIG. 2A is a perspective view of a pin felt coupling device in an uncoupled configuration in accordance with another exemplary embodiment of the present invention.
Figure 2B:
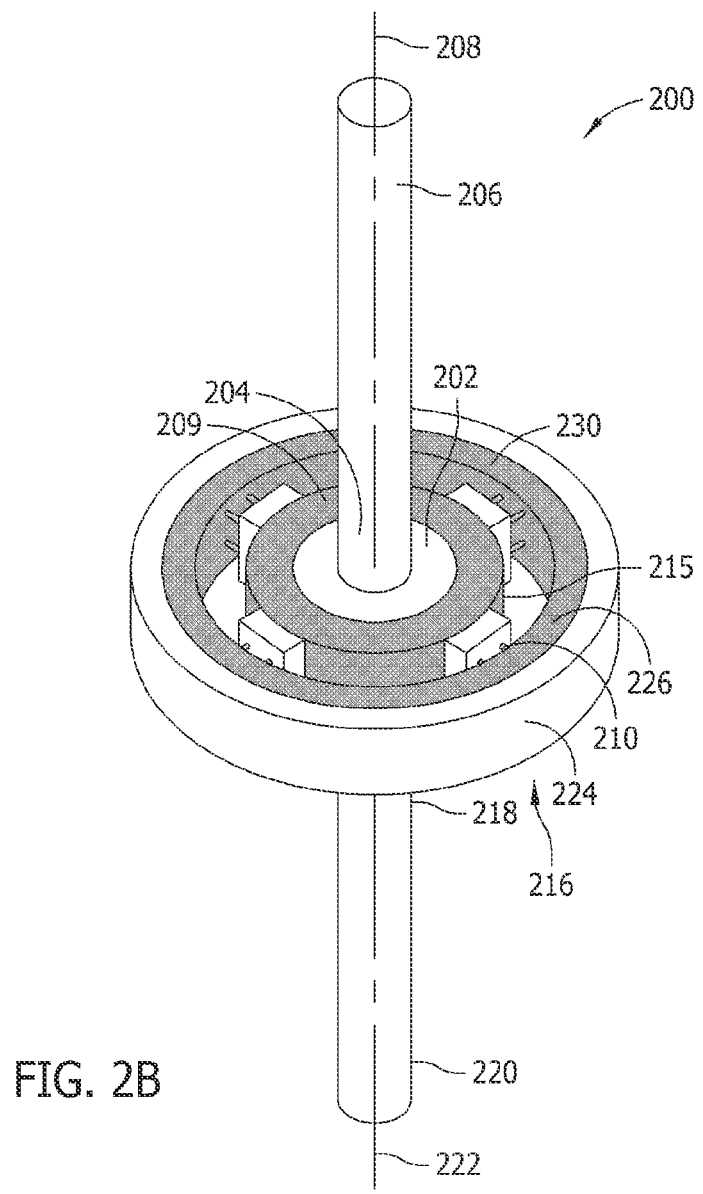
FIG. 2B is a perspective view of coupling device in a coupled configuration.

FIG. 2A is a perspective view of a pin felt coupling device 200 in an uncoupled configuration in accordance with another exemplary embodiment of the present invention. FIG. 2B is a perspective view of coupling device 200 in a coupled configuration. In the exemplary embodiment, coupling device 200 includes a first flange 202 coupled to a distal end 204 of a first shaft 206. First shaft 206 includes a longitudinal axis of rotation 208. First flange 202 includes an inflatable torus 209 at least partially surrounding a circumferential periphery of first flange 202. Torus 209 includes one or more radially extending pins 210 having a height 212 and a diameter 214 that extend radially away from a radially outward facing rim 215 of torus 209. Although described as pins having a diameter, pins 210 can be embodied in pins, prongs, studs, or other projections and can have any shaped cross-section and diameter 214 may refer to, rather than a circular dimension, but rather a cross-sectional dimension substantially perpendicular to axis 208. In the exemplary embodiment, height 212 is significantly greater than diameter 214.

Coupling device 200 also includes a second flange 216 coupled to a distal end 218 of a second shaft 220. Second shaft 220 includes a longitudinal axis of rotation 222. Second flange 216 includes one or more circumferentially extending raised sidewall 224 extending around a periphery 223 of a face 225 of flange 216. In the exemplary embodiment, a receptive media 230 is positioned along a radially inner surface 226 of sidewall 224. Receptive media 230 may be formed of, for example, but not limited to, felt, metal wool, and gel.

During operation, first flange 202 and second flange 216 are positioned face-to-face a distance 232 apart. Distance 232 is selectable to permit an engagement of pins 210 and receptive media 230 to a coupled configuration of coupling device 200 (shown in FIG. 2B) where torus 209 is inflated, which increases a diameter of torus 209. Distance 232 is also selectable to permit a disengagement of pins 210 and receptive media 230 to an uncoupled configuration of coupling device 200 (shown in FIG. 2A) where torus 209 is deflated, which decreases a diameter of torus 209. Distance 232 may be selectively variable to permit withdrawal of one of first flange 202 and second flange 216 away from proximity to the other of first flange 202 and second flange 216. Alternatively, distance 232 may be fixed, maintaining first flange 202 and second flange 216 in relatively close proximity. Receptive media 230 is formed of a material that is penetrable by pins 210 and sufficiently resilient to receive a rotational force in the circumferential direction from pins 210 and transfer the force to second flange 216. Pins 210 engage receptive media 230 by penetrating a surface of receptive media 230 or by fitting into cavities 233 in surface 231. In one embodiment, cavities 233 are formed in surface 231 complementary to pins 210. In various embodiments, cavities 233 are formed in surface 231 by the engagement of pins 210 with surface 231. For example, a pin 210 engaging surface 231 may dislocate a local portion of surface 231 to create an opening through which pin 210 is able to further penetrate surface 231 and slide into full engagement with media 230. Dislocating the local portion and sliding past media 230 causes friction between pins 210 and media 230, which defines an amount of axial force needed to fully engage pins 210 and media 230. Pins 210 and media 230 are selected such that engagement and disengagement of pins 210 and media 230 results in a relatively minor amount of long term damage to either pins 210 or media 230 thereby providing a relatively long life and/or number of engagement/disengagement cycles. After engagement, one of shafts 206 or 220 can drive the other through coupling device 200. Engagement and disengagement normally only occurs when shafts 206 and 220 are stationary.

Figure 3A:
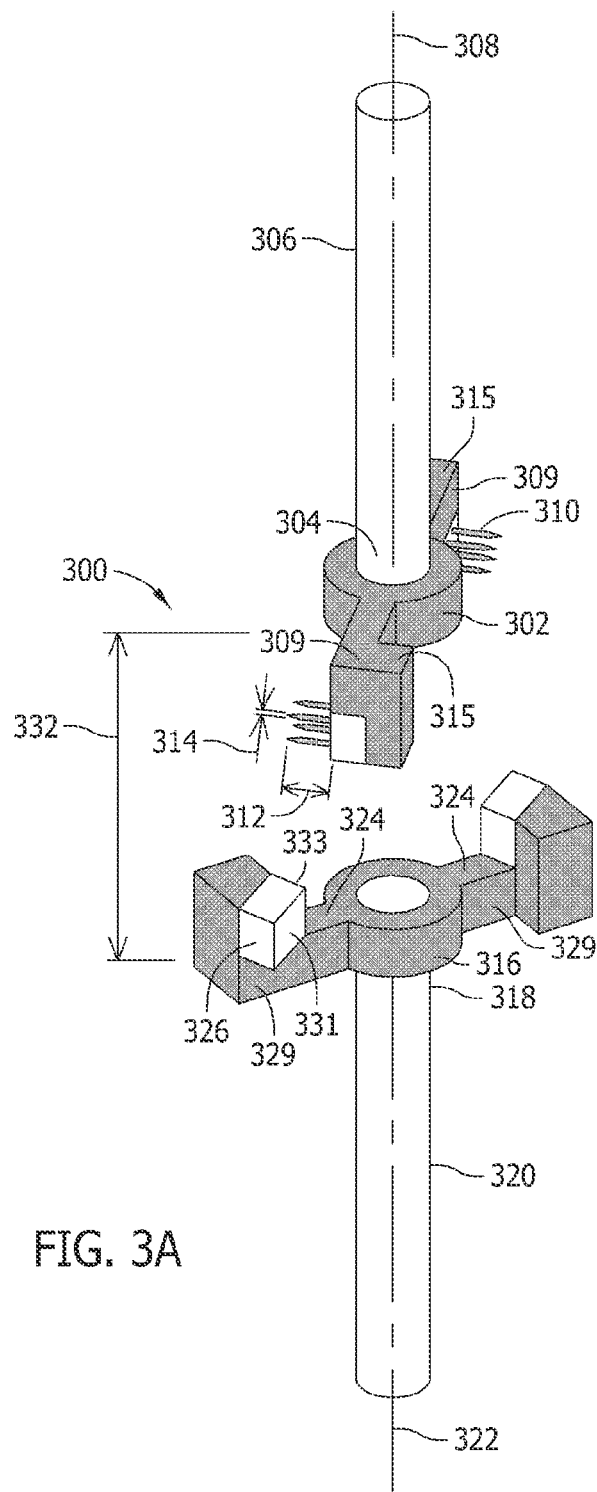
FIG. 3A is perspective view of a pin felt coupling device in an uncoupled configuration in accordance with still another exemplary embodiment of the present invention.
Figure 3B:
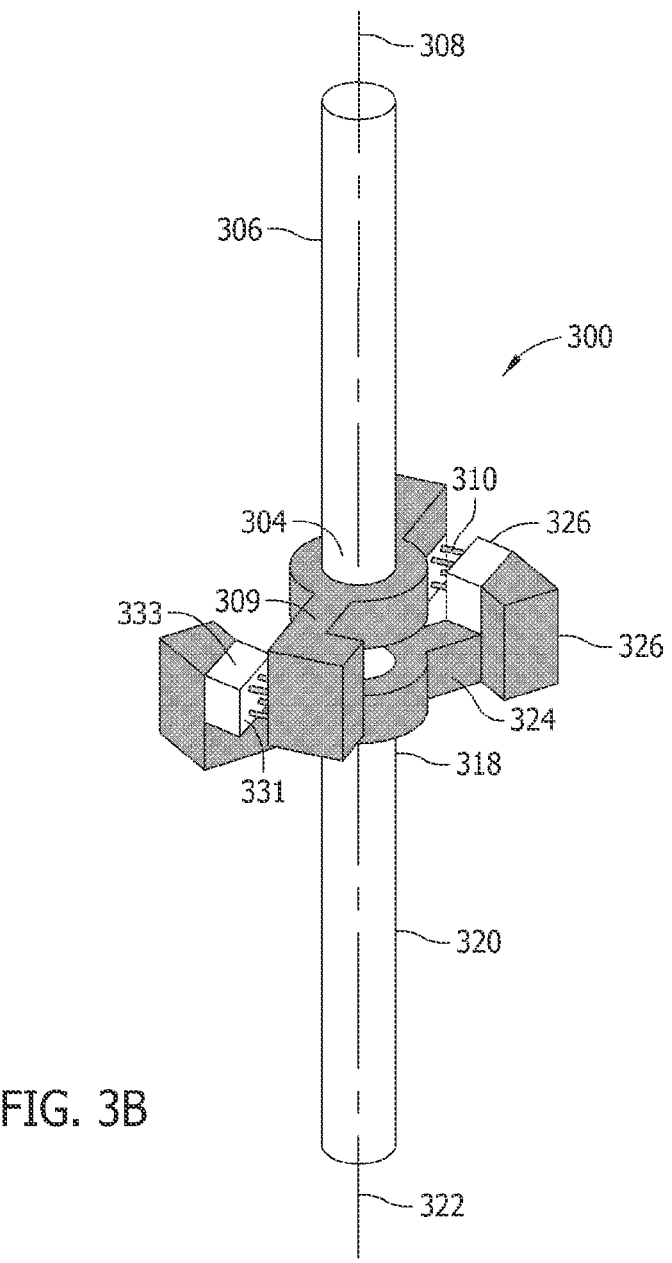
FIG. 3B is a perspective view of coupling device in a coupled configuration.

FIG. 3A is perspective view of a pin felt coupling device 300 in an uncoupled configuration in accordance with still another exemplary embodiment of the present invention. FIG. 3B is a perspective view of coupling device 300 in a coupled configuration. In the exemplary embodiment, coupling device 300 includes a first arm assembly 302 coupled to a distal end 304 of a first shaft 306. First shaft 306 includes a longitudinal axis of rotation 308. First arm assembly 302 includes one or more radially outwardly extending arms 309. One or more pins 310 having a height 312 and a diameter 314 extend away from a distal end 315 of arms 309 in a direction of rotation for coupling coupling device 300. Although described as pins having a diameter, pins 310 can be embodied in pins, prongs, studs, or other projections and can have any shaped cross-section and diameter 314 may refer to, rather than a circular dimension, but rather a cross-sectional dimension substantially perpendicular to axis 308. In the exemplary embodiment, height 312 is significantly greater than diameter 314.

Coupling device 300 also includes a second arm assembly 316 coupled to a distal end 318 of a second shaft 320. Second shaft 320 includes a longitudinal axis of rotation 322. Second arm assembly 316 includes one or more arms 324 extending radially outward from second arm assembly 316. Arms 324 include pads 326 comprising a receptive media that is coupled to or formed with a distal end 329 of arms 324. The receptive media of pads 326 is configured to receive pins 310 when one of first arm assembly 302 and/or second arm assembly 316 is rotated into engagement with the other. The receptive media is also configured to release pins 310 when one of first arm assembly 302 and/or second arm assembly 316 is rotated to disengage the other. The receptive media may be formed of, for example, but not limited to, felt, metal wool, and gel.

During use, first arm assembly 302 and second arm assembly 316 are positioned face-to-face a distance 332 apart. Distance 332 is selectable to permit an engagement of pins 310 and the receptive media to a coupled configuration of coupling device 300 (shown in FIG. 3B). Distance 332 is also selectable to permit a disengagement of pins 310 and receptive media to an uncoupled configuration of coupling device 300 (shown in FIG. 3A). Distance 332 may be selectively variable to permit withdrawal of one of first arm assembly 302 and second arm assembly 316 away from proximity to the other of first arm assembly 302 and second arm assembly 316.

The receptive media is formed of a material that is penetrable by pins 310 and sufficiently resilient to receive a rotational force in the circumferential direction from pins 310 and transfer the force to second arm assembly 316. Pins 310 engage the receptive media by penetrating a surface of the receptive media or by fitting into cavities 333 in a receptive media surface 331. In one embodiment, cavities 333 are formed in surface 331 complementary to pins 310. In various embodiments, cavities 333 are formed in surface 331 by the engagement of pins 310 with surface 331. For example, a pin 310 engaging surface 331 may dislocate a local portion of surface 331 to create an opening through which pin 310 is able to further penetrate surface 331 and slide into full engagement with media. Dislocating the local portion and sliding past media causes friction between pins 310 and media, which defines an amount of axial force needed to fully engage pins 310 and media. Pins 310 and media are selected such that engagement and disengagement of pins 310 and media results in a relatively minor amount of long term damage to either pins 310 or media thereby providing a relatively long life and/or number of engagement/disengagement cycles. After engagement, one of shafts 306 or 320 can drive the other through coupling device 300.

Figure 4:
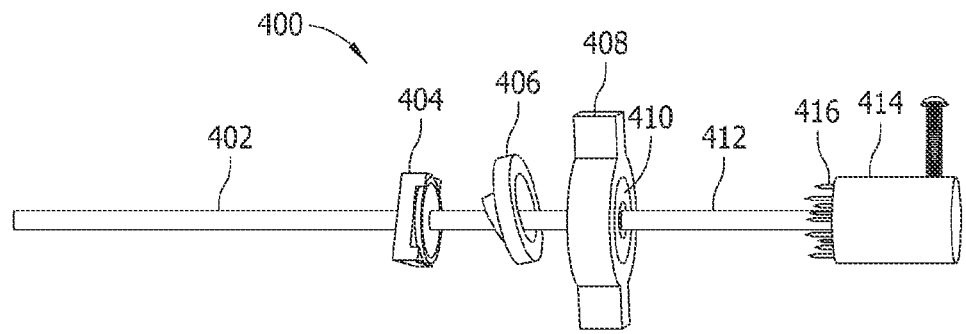

FIG. 4 is an exploded view of a dual pin felt coupling device 400 in accordance with yet another exemplary embodiment of the present invention. In the exemplary embodiment, coupling device 400 includes a shaft 402, a fixed cam 404, a rotary cam 406, an output rotor 408, a receptive media 410, a bias member 412, a driver pin array 414, and one or more engagement pins 416.

Figure 5:
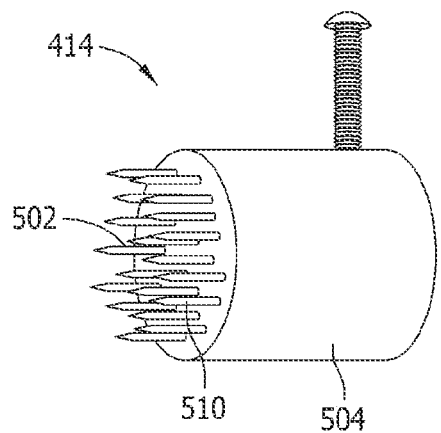

FIG. 5 is a perspective view of driver pin array 414 in accordance with an exemplary embodiment of the present invention. In the exemplary embodiment, driver pin array 414 includes a spring socket 502 and a plurality of pins 510 fixedly coupled to a shell 504.

Figure 6:
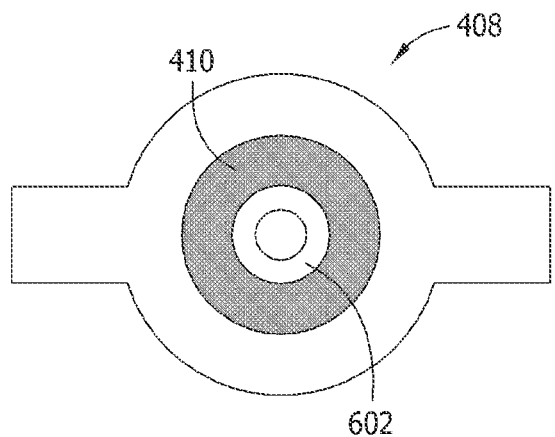

FIG. 6 is a perspective view of a driver side of output rotor 408 in accordance with an exemplary embodiment of the present invention. In the exemplary embodiment, output rotor 408 includes receptive media 410 and a bearing 602.

Figure 7:
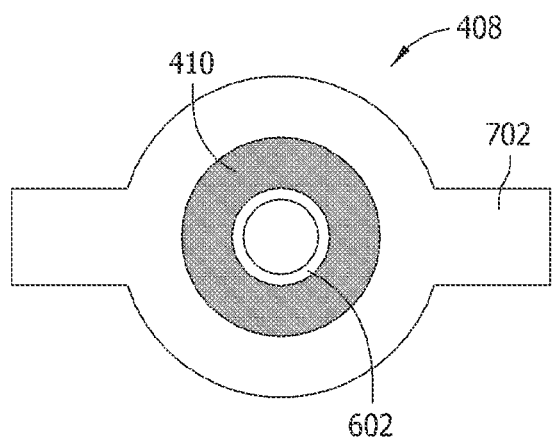

FIG. 7 is a perspective view of a cam side of output rotor 408 in accordance with an exemplary embodiment of the present invention. In the exemplary embodiment, output rotor 408 includes receptive media 410, bearing 602, and an output arm 702.

Figure 8:
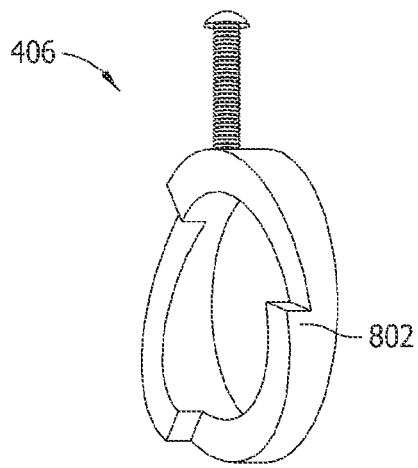

FIG. 8 is a perspective view of rotary cam 406 in accordance with an exemplary embodiment of the present invention. In the exemplary embodiment, rotary cam 406 includes a lobe 802.

Figure 9:
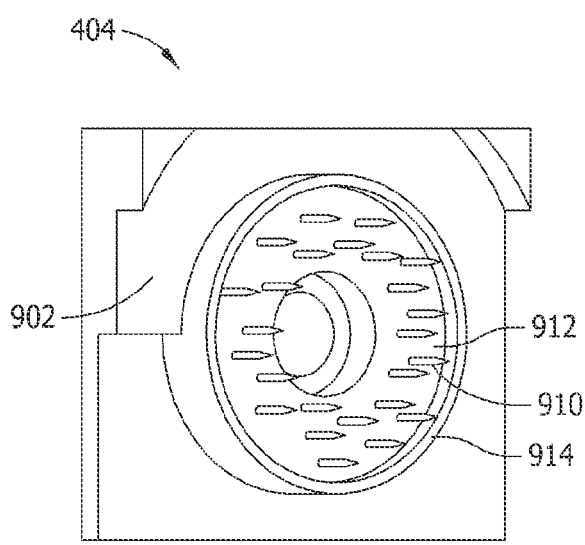

FIG. 9 is a perspective view of fixed cam 404 in accordance with an exemplary embodiment of the present invention. In the exemplary embodiment, fixed cam 404 includes a lobe 902, a plurality of pins 910, and a matrix 912 fixedly holding pins in a housing 914.

Figure 10:
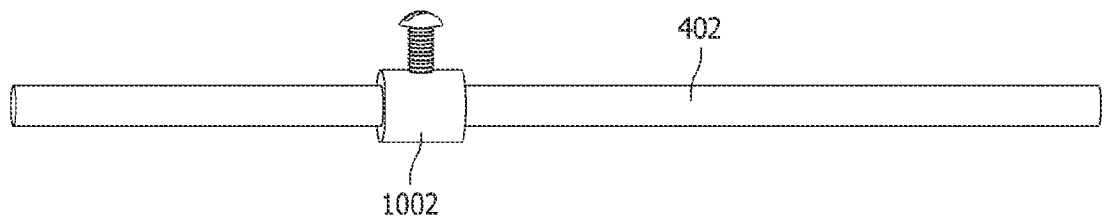

FIG. 10 is a perspective view of shaft 402 in accordance with an exemplary embodiment of the present invention. In the exemplary embodiment, shaft 402 includes a shaft collar 1002.

Figure 11:
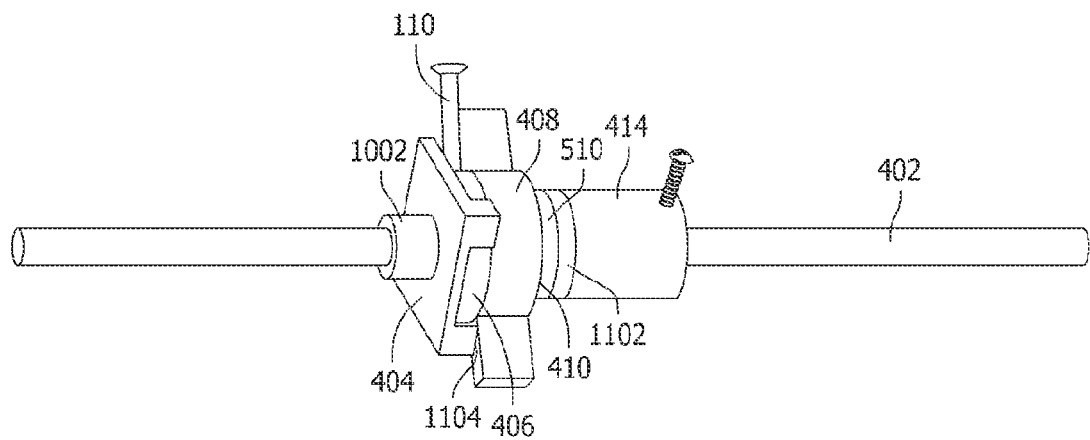
Figure 12:
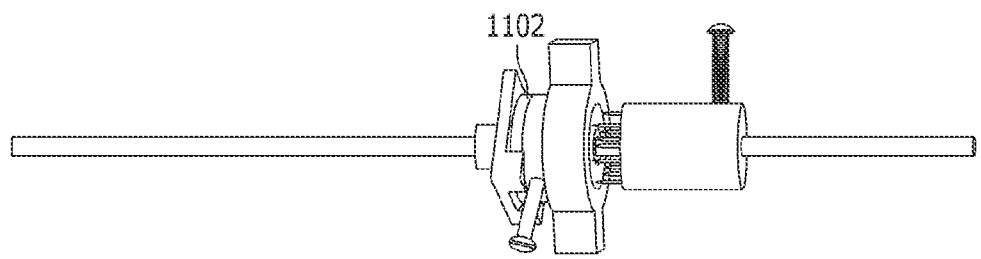

FIG. 11 is a perspective view of fully assembled pin felt coupling device 400 in an uncoupled configuration where shaft 402 is freely rotatable while holding output rotor 408 stationary. FIG. 12 is a perspective view of fully assembled pin felt coupling device 400 in a coupled configuration where a rotation force applied to shaft 402 is transferred through pins 510 and receptive media 410. In the exemplary embodiment, coupling device 400 includes shaft 402, fixed cam 404, rotary cam 406, output rotor 408, receptive media 410, bias member 412, and driver pin array 414 assembled onto shaft 402. A double coupling is used to retain the rotational angle of output rotor 408. Output rotor 408 is coupled to driver pin array 414 with a first pin felt coupling 1102 of double pin felt coupling device 400 and decoupled from fixed cam 404 with cam fixed pins 910 (as it would be normally attached to another part of the machine) cam by retracting a second pin felt coupling 1104. There is overlap in this operation so that the rotation angle of output rotor 408 is retained because pins 416 are inserted into the driver side media 410 before they are completely removed from the fixed pin side media.

In the un-operated position (shown in FIG. 11), shaft 402 can be freely rotated with out changing the position of output rotor 408 which is held in position by pins on the fixed side. During operation, pins are retracted from the felt on the fixed side of the output rotor and inserted into the felt on the driver side (shown in FIG. 12). During this operation the pins can be inserted into the driver side felt before they are completely withdrawn from the fixed side felt so that the rotary orientation of the output rotor is preserved. After the operation is complete rotation of the shaft will rotate the output rotor.

A ratio of insertion force to torque capability of the coupling as well as the rotational accuracy depend on factors including for example, materials, number of pins and coupling size. The insertion force may be by mechanical means such as a cam or a lever. It could be also be electromagnetic provided by a coil or provided by a fluid power cylinder, bellows or inflatable/deflatable flexible membrane or electrostatic.

Figure 14:
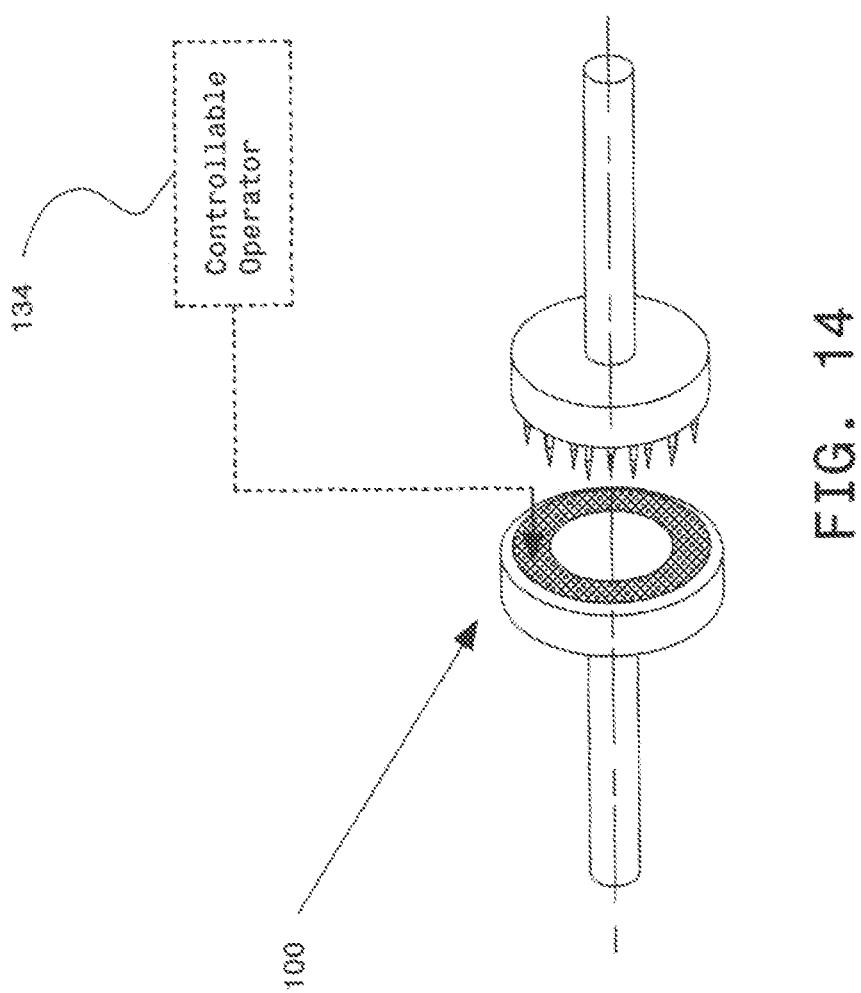
FIG. 14 is a perspective view of a coupling device in an uncoupled configuration in accordance with an exemplary embodiment of the present invention, wherein a controllable operator for activating the media is diagrammatically illustrated.

The forces that provide low resistance to pin insertion but higher resistance to orthogonal pin movement can be inherent in the properties of the receiving media such as a fiber media like felt or metal wool or may need to be activated by another controllable means (i.e., controllable operator 134) as shown in FIG. 14. An example would be wax that would be activated to receive the pins with heat and then cooled to resist orthogonal motion. The activation may be required to insert the pins like the wax example or activation of a fluidized bed with air flow or the activation may be required to provide the orthogonal resistance such as turning on a magnetic coil to increase the viscosity of a fluid with magnetic particles suspended in it. Insertion could also be enhanced by vibration induced by mechanical or sonic means.

Figure 13:
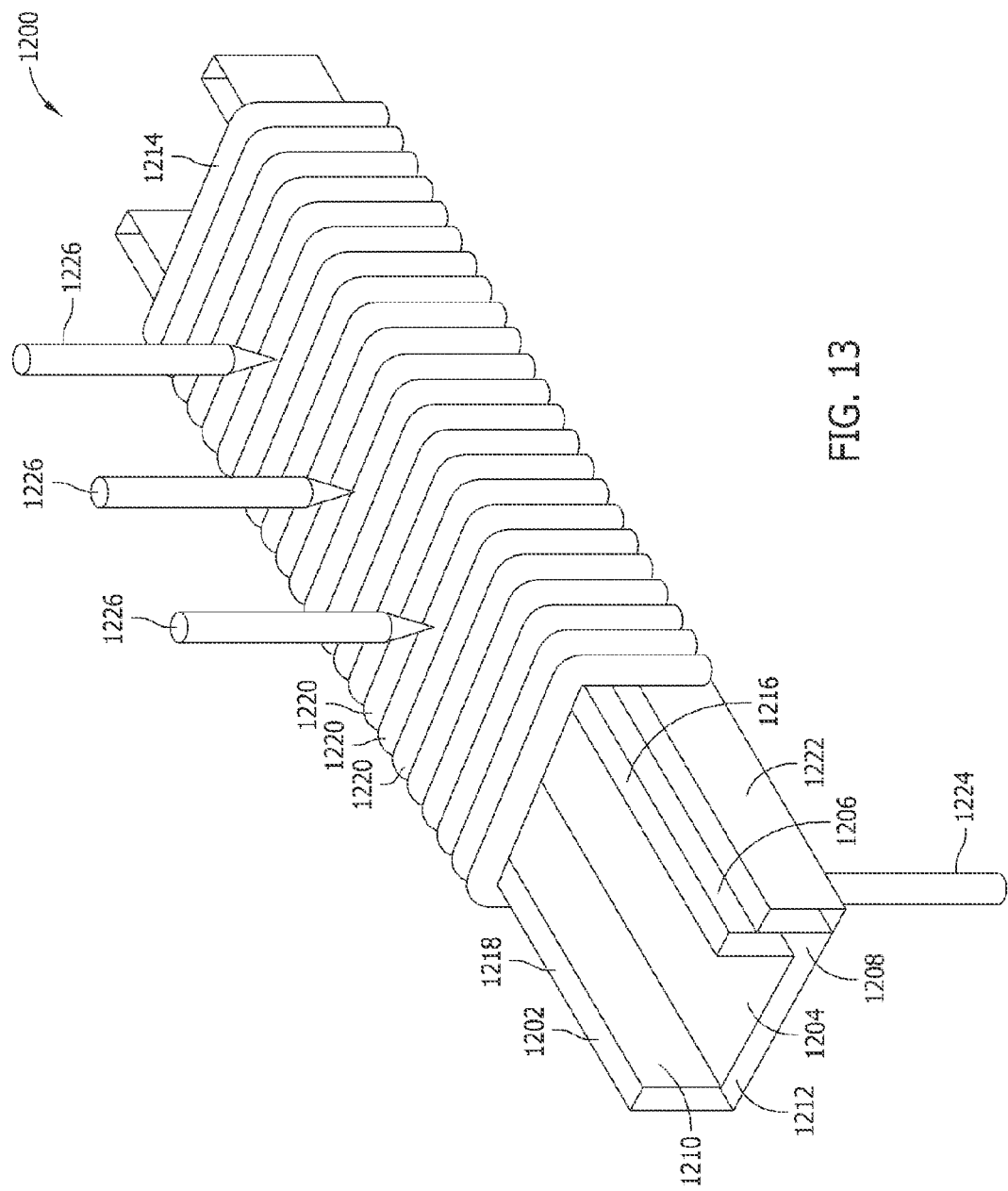
FIG. 13 is a perspective view of a receptive flange in accordance with an exemplary embodiment of the present invention.

FIG. 13 is a perspective view of a receptive flange 1200 in accordance with an exemplary embodiment of the present invention. Receptive flange 1200 may be used with flange 102 (shown in FIG. 1), flange 216 (shown in FIG. 2), and arm assembly 316 (shown in FIG. 3). In the exemplary embodiment, receptive flange 1200 includes a U-shaped channel 1202 that includes a base 1204, a first sidewall 1206 extending orthogonally away from a first edge 1208 of base 1204, and a second sidewall 1210 extending orthogonally away from a second edge 1212 of base 1204 in the same direction as first sidewall 1206. In the embodiment illustrated in FIG. 12, channel 1202 is represented in a linear configuration. However, it should be understood, in other embodiments, channel 1202 may be a circular member having sidewalls 1206 and 1210 extending circumferentially about a central axis wherein each of sidewalls 1206 and 1210 are concentric with respect to each other.

A receptive media 1214 extends from a distal end 1216 of first sidewall 1206 to a distal end 1218 of second sidewall 1210. In the exemplary embodiment, receptive media 1214 includes a plurality of closely-spaced rigid or semi-rigid members 1220. Members 1220 may also be formed of a resilient material stretched taut between sidewalls 1206 and 1210. In one embodiment, members 1220 are formed of an elongate member, for example, but not limited to, a thread, a string or cable fabricated of a material such as, but not limited to, aramid, ultra high molecular weight polyethylene (UHM-WPE), or a polyhydroquinone-diimidazopyridine (M5) fiber that is wound around receptive flange 1200. In the exemplary embodiment, each turn of members 1220 is in contact with each adjacent turn of member 1220. Further, in other embodiments, members 1220 may be wound to form a plurality of layers with each layer of members 1220 overlapping members of adjacent layers. Members 1220 may be secured in place using an adhesive 1222 applied to outer surfaces of base 1204, and sidewalls 1206 and 1210 prior to applying members 1220. Alternatively, member 1220 may be coated with an adhesive 1224 prior to winding member 1220 around receptive flange 1200. Adhesive 1224 may be activated after application using for example, but not limited to, heat, or a second part of a two part adhesive.

Receptive media 1214 is configured to receive a plurality of pins 1226 extending from a flange (not shown) complementary to receptive flange 1200. During operation, pins 1226 are advanced to engagement with member 1220 of receptive media 1214. Pins 1226 tend to spread members 1220 apart and slide between members 1220. A lateral force imparted by pins 1226 to members 1220 causes base 1204 to move in the direction of the applied force. For precision positioning applications using a smaller diameter member 1220 and/or pins 1226 tends to increase a resolution of a position of base 1204 with respect to the flange carrying pins 1226.

The above-described embodiments of a method and system of a shaft coupling that is engageable/disengagable and maintains positional or rotational accuracy between coupling halves provides a cost-effective and reliable means for transmitting rotational power. More specifically, the method and system described herein facilitate infinite rotational resolution and accurate repeatability of the shaft coupling. As a result, the method and system described herein facilitate transmitting rotational force from a first shaft to a second shaft in a cost-effective and reliable manner.

An exemplary method and system for coupling two coaxial shafts are described above in detail. The apparatus illustrated is not limited to the specific embodiments described herein, but rather, components of each may be utilized independently and separately from other components described herein. Each system component can also be used in combination with other system components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A shaft coupling assembly comprising:
   a first coupling device coupled to an end of a power shaft, said first coupling device comprising a first plurality of projections extending away from said first coupling device;
   a second coupling device, said second coupling device comprising a second plurality of projections extending away from said second coupling device;
   a third coupling device disposed between said first coupling device and said second coupling device, said third coupling device comprising a first side and a second side disposed opposite to said first side, said first side of said third coupling device comprising a first media configured to matingly engage said first plurality of projections in an axial direction of said first projections, said second side of said third coupling device comprising a second media configured to matingly engage said second plurality of projections in an axial direction of said second projections;

wherein said first and second pluralities of projections comprise a relatively large length to width ratio and when inserted into respective said first and second media, said first and second media displace orthogonally to the insertion direction an amount sufficient to facilitate the insertion for each individual projection while substantially preventing gross movement of all of said projections in total such that a torque applied to one of said coupling devices is transmitted through the mated projections and media; and wherein said first plurality of projections are inserted into said first media before said second plurality of projections are completely removed from said second media.

2. An assembly in accordance with claim 1, wherein at least some of said first and second pluralities of projections comprise a pin and said first and second media comprise at least one of a felt, a metal wool, a fiber mat, a foam, and a gel.

3. An assembly in accordance with claim 1, wherein said third coupling device comprises a circular U-shaped channel open towards said first coupling device, and said first media comprises an elongate member wound around at least a portion of said U-shaped channel forming a first layer of adjacent turns suspended between legs of said U-shaped channel.

4. An assembly in accordance with claim 3, wherein said elongate member is wound to form one or more additional layers covering said first layer.

5. An assembly in accordance with claim 3, wherein said elongate member comprises at least one of an aramid fiber, an ultra high molecular weight polyethylene (UHMWPE) fiber, and a polyhydroquinone-diimidazopyridine (M5) fiber.

6. An assembly in accordance with claim 1, wherein said third coupling device further comprises a centrally disposed bearing circumscribed by said first and second media, and radially extending output arms extending from opposed sides of said third coupling device.

7. An assembly in accordance with claim 1, wherein said second coupling device further comprises a fixed cam lobe disposed radially outward from a portion of said second plurality of projections.

8. An assembly in accordance with claim 7, further comprising a rotary cam disposed between said second coupling device and said third coupling device, said rotary cam including at least one rotary cam lobe.

9. A precision positioning system comprising:
a source of mechanical power comprising a power shaft configured to transmit the mechanical power; and
a shaft coupling assembly including:
a first coupling device coupled to an end of the power shaft, said first coupling device comprising a first plurality of projections extending away from said first coupling device;
a second coupling device, said second coupling device comprising a second plurality of projections extending away from said second coupling device;
a third coupling device disposed between said first coupling device and said second coupling device, said third coupling device comprising a first side and a second side disposed opposite to said first side, said first side of said third coupling device comprising a first media configured to matingly engage said first plurality of projections in an axial direction of said first projections, said second side of said third coupling device comprising a second media configured to matingly engage said second plurality of projections in an axial direction of said second projections;

wherein said first and second pluralities of projections comprise a relatively large length to width ratio and when inserted into respective said first and second media, said first and second media displace orthogonally to the insertion direction an amount sufficient to facilitate the insertion for each individual projection while substantially preventing gross movement of all of said projections in total such that a torque applied to one of said coupling devices is transmitted through the mated projections and media;

wherein said first plurality of projections are inserted into said first media before said second plurality of projections are completely removed from said second media; and wherein said power shaft is coupled to said third coupling device via said first coupling device during a positioning period and is decoupled from said third coupling device during a quiescent period.

10. A system in accordance with claim 9, wherein at least some of said first and second pluralities of projections comprise a pin and said first and second media comprise at least one of a felt, a metal wool, a fiber mat, a foam, and a gel.

11. A system in accordance with claim 9, wherein said third coupling device comprises a circular U-shaped channel open towards said first coupling device, and said first media comprises an elongate member wound around at least a portion of said U-shaped channel forming a first layer of adjacent turns suspended between legs of said U-shaped channel.

12. A system in accordance with claim 11, wherein said elongate member is wound to form one or more additional layers covering said first layer.

13. A system in accordance with claim 11, wherein said elongate member comprises at least one of an aramid fiber, an ultra high molecular weight polyethylene (UHMWPE) fiber, and a polyhydroquinone-diimidazopyridine (M5) fiber.

14. A system in accordance with claim 9, wherein said third coupling device further comprises a centrally disposed bearing circumscribed by said first and second media, and radially extending output arms extending from opposed sides of said third coupling device.

15. A system in accordance with claim 9, wherein said second coupling device further comprises a fixed cam lobe disposed radially outward from a portion of said second plurality of projections.

16. A system in accordance with claim 15, further comprising a rotary cam disposed between said second coupling device and said third coupling device, said rotary cam including at least one rotary cam lobe.

* * * * *